US007618322B2

(12) United States Patent
Shimizu et al.

(10) Patent No.: US 7,618,322 B2
(45) Date of Patent: Nov. 17, 2009

(54) GAME SYSTEM, STORAGE MEDIUM STORING GAME PROGRAM, AND GAME CONTROLLING METHOD

(75) Inventors: Takao Shimizu, Kyoto (JP); Yoshiaki Koizumi, Kyoto (JP); Takeshi Hayakawa, Kyoto (JP); Koichi Hayashida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 291 days.

(21) Appl. No.: 11/123,070

(22) Filed: May 6, 2005

(65) Prior Publication Data

US 2005/0288099 A1    Dec. 29, 2005

(30) Foreign Application Priority Data

May 7, 2004   (JP)   .............. 2004-138430

(51) Int. Cl.
*G06F 19/00* (2006.01)
(52) U.S. Cl. .............. 463/36; 463/35; 463/37; 273/460; 273/461; 84/600; 84/710
(58) Field of Classification Search .............. 463/2–8, 463/16, 20, 23, 30–32, 34, 35, 36–37, 40–43, 463/46–47, 50, 53, 56, 58–69; 273/108.1, 273/138.1, 138.2, 139, 141 A, 141 R, 142 A, 273/142 B, 142 C, 142 H, 142 HA, 150, 273/317.1, 460–461; 84/730, 600, 710
See application file for complete search history.

(56) References Cited

U.S. PATENT DOCUMENTS 3,956,959 A  *  5/1976  Ebihara et al.  ............. 84/725
4,418,598 A  * 12/1983  Klynas  ..................... 84/636
4,432,265 A  *  2/1984  Oya et al.  .................. 84/607
4,526,078 A  *  7/1985  Chadabe  .................... 84/602
4,741,242 A  *  5/1988  Aronstein  .................. 84/454

(Continued)

FOREIGN PATENT DOCUMENTS

JP          11-226238        8/1999

(Continued)

OTHER PUBLICATIONS

Japanese Office Action dated May 12, 2009 (4 pages).

(Continued)

*Primary Examiner*—Peter DungBa Vo
*Assistant Examiner*—Arthur O. Hall
(74) *Attorney, Agent, or Firm*—Nixxon & Vanderhye P.C.

(57) ABSTRACT

A game system includes a game apparatus, and the game apparatus is connected with a monitor and a percussion-type controller. When a game player beats a first beating operation surface or a second beating operation surface, first operation data is input from the controller to the game apparatus. Furthermore, when a microphone detects an operation sound generated at a time that a beating operation is performed, second operation data including volume data is input from the controller to the game apparatus. In the game apparatus, when a magnitude of the volume data is equal to or more than the predetermined threshold value, an ability value as to an action of the player object to be executed according to a command indicated by the first operation data is changed to execute the action.

13 Claims, 13 Drawing Sheets

U.S. PATENT DOCUMENTS

| | | | | |
|---|---|---|---|---|
| 4,781,097 | A * | 11/1988 | Uchiyama et al. | 84/738 |
| 5,009,146 | A * | 4/1991 | Manabe et al. | 84/615 |
| 5,223,654 | A * | 6/1993 | Fujita | 84/627 |
| 5,256,832 | A * | 10/1993 | Miyake | 84/636 |
| 5,262,585 | A * | 11/1993 | Greene et al. | 84/645 |
| 5,491,297 | A * | 2/1996 | Johnson et al. | 84/609 |
| 5,525,142 | A * | 6/1996 | Yamauchi et al. | 84/602 |
| 5,614,687 | A * | 3/1997 | Yamada et al. | 84/662 |
| 6,004,209 | A * | 12/1999 | Katsumoto et al. | 463/30 |
| 6,005,181 | A * | 12/1999 | Adams et al. | 84/734 |
| 6,018,121 | A * | 1/2000 | Devecka | 84/743 |
| 6,031,176 | A * | 2/2000 | Tanaka | 84/735 |
| 6,075,197 | A * | 6/2000 | Chan | 84/730 |
| 6,121,538 | A * | 9/2000 | Yoshino et al. | 84/738 |
| 6,168,519 | B1 * | 1/2001 | Nakagawa et al. | 463/4 |
| 6,225,547 | B1 * | 5/2001 | Toyama et al. | 84/611 |
| 6,268,557 | B1 * | 7/2001 | Devecka | 84/743 |
| 6,342,665 | B1 * | 1/2002 | Okita et al. | 84/609 |
| 6,369,313 | B2 * | 4/2002 | Devecka | 84/743 |
| 6,379,244 | B1 * | 4/2002 | Sagawa et al. | 463/7 |
| 6,524,187 | B2 * | 2/2003 | Komata | 463/37 |
| 6,545,207 | B2 * | 4/2003 | McAfee et al. | 84/470 R |
| 6,645,067 | B1 * | 11/2003 | Okita et al. | 463/7 |
| 6,685,480 | B2 * | 2/2004 | Nishimoto et al. | 434/247 |
| 6,821,203 | B2 * | 11/2004 | Suga et al. | 463/7 |
| 6,822,152 | B2 * | 11/2004 | Yamada et al. | 84/484 |
| 6,835,887 | B2 * | 12/2004 | Devecka | 84/743 |
| 6,945,871 | B2 * | 9/2005 | Uenishi et al. | 463/35 |
| 7,015,391 | B2 * | 3/2006 | Tomoda | 84/726 |
| 7,112,739 | B2 * | 9/2006 | Mori et al. | 84/737 |
| 7,373,209 | B2 * | 5/2008 | Tagawa et al. | 700/94 |
| 7,447,639 | B2 * | 11/2008 | Wang | 704/503 |
| 2001/0008851 | A1 * | 7/2001 | Komata | 463/37 |
| 2002/0062726 | A1 * | 5/2002 | Abe | 84/464 A |
| 2003/0061932 | A1 * | 4/2003 | Tanaka et al. | 84/734 |

FOREIGN PATENT DOCUMENTS

| | | | |
|---|---|---|---|
| JP | 11226238 | A * | 8/1999 |
| JP | 2001-276421 | | 10/2001 |
| JP | 2001-327751 | | 11/2001 |
| JP | 2002-078970 | | 3/2002 |
| JP | 2002-297129 | | 10/2002 |
| JP | 2005-168763 | | 6/2005 |

OTHER PUBLICATIONS

GameCube, Dec. 2003, 4 pages with English translation of last page (5 pages total).

* cited by examiner

FIG. 7

OPERATION SIGNAL

| (000) Tx | b7 | b6 | b5 | b4 | b3 | b2 | b1 | b0 |
|---|---|---|---|---|---|---|---|---|
| 1st byte | 0 | 0 | ORG_CH | START | Y | X | B | A |
| 2nd byte | FIN | L | R | Z | UP | DOWN | RIGHT | LEFT |
| 3rd byte | CONTROL STICK ANALOG X[7:0] | | | | | | | |
| 4th byte | CONTROL STICK ANALOG Y[7:0] | | | | | | | |
| 5th byte | C STICK ANALOG X[7:0] | | | | | | | |
| 6th byte | C STICK ANALOG Y[7:0] | | | | | | | |
| 7th byte | L TRIGGER[7:0] | | | | | | | |
| 8th byte | R TRIGGER[7:0] | | | | | | | |

FIG. 9

| ACTION | GAME PROCESS SETTING INFORMATION ||
|---|---|---|
| PUNCH | FIRST GAME PROCESS | OFFENSIVE POWER 20 |
|  | SECOND GAME PROCESS | OFFENSIVE POWER 10 |
| JUMP | FIRST GAME PROCESS | JUMPING POWER 30 |
|  | SECOND GAME PROCESS | JUMPING POWER 15 |

(A) GAME SCREEN OF FIRST GAME PROCESS   OBJECT OF ROCK

PLAYER OBJECT (B) GAME SCREEN OF SECOND GAME PROCESS

PLAYER OBJECT     OBJECT OF ROCK (A) GAME SCREEN OF FIRST GAME PROCESS    PLAYER OBJECT (B) GAME SCREEN OF SECOND GAME PROCESS    PLAYER OBJECT

GAME SYSTEM, STORAGE MEDIUM STORING GAME PROGRAM, AND GAME CONTROLLING METHOD

FIELD

The illustrative example implementations disclosed relates to a game system, a storage medium storing a game program, and a game controlling method. More specifically, the example implementations relates to a game system, a storage medium storing a game program, and a game controlling method that are able to display a game image including a player object being operable by the player on a display apparatus.

BACKGROUND AND SUMMARY

One example of this kind of a conventional game system is disclosed in a Japanese Patent Laying-open No. 2001-327751 [A63F 13/00] laid-open on Nov. 27, 2001. In the action game apparatus, when a sports game such as soccer, etc. is played, a pressure sensitive value at a time of depressing a button is detected to detect a difference of pressure in depressing the button, and according to the detected difference of pressure, a speed, a trace, or the like of the ball is set.

Another example of this kind of a conventional game system is disclosed in a Japanese Patent Laying-open No. 2002-78970 [A63F 13/06, A63F 13/00, G10L 11/02, G10L 15/04] laid-open on Mar. 19, 2002. By utilizing the input apparatus for a game, it is possible to change proceeding of the game program depending on the volume of sound detected by a microphone.

In the former, it is necessary to provide a pressure sensor, etc. for detecting a pressure sensitive value at a time of depressing a button for each button. Therefore, as the number of buttons is increased, the number of pressure sensors corresponding thereto has to be increased, which may cause a high cost to be incurred. Furthermore, if the button is intensely depressed repeatedly over a long term, since an impact at a time of depressing the button is directly applied to the pressure sensor the pressure sensor may be damaged.

In the latter, a content of the game is changed based only on the volume of the sound detected by the microphone, and any disclosure as to a relationship between the detected sound and a controller operation is not performed.

SUMMARY OF THE INVENTION

The illustrative exemplary non-limiting implementations disclosed herein provide a novel game system, storage medium storing a game program, and game controlling method.

According to an illustrative example implementation, a game system, a storage medium storing a game program, and a game controlling method are provided that are able to change a content of the game depending on a difference of strength in operation by detecting an operation sound when a controller is operated.

A game system according to one non-limiting illustrative example implementation displays a game image including a player object operable by a player. The game system comprises a controller, an operation data detecting means, an operation sound detecting means, a volume value detecting means, and a game processing means. The controller has an operation surface which is subjected to elastic deformation by a beating operation with a hand of the player. The operation data detecting means detects operation data input in response to a beating operation of the controller. The operation sound detecting means detects an operation sound generated in response to the beating operation of the controller. The volume value detecting means detects a volume value of the operation sound detected by the operation sound detecting means. The game processing means changes game processes based on the operation data depending on the volume value detected by the volume value detecting means when both of the operation data and the operation sound are detected within a predetermined time period.

More specifically, the game system (10—a reference numeral used for illustrative purposes only—) displays a game image including the player object operable by the player on the display apparatus (30). The controller (100) has the operation surface (120, 122) which is subjected to elastic deformation by a beating operation with the hand of the player. The operation data detecting means (36, S7) detects operation data input in response to a beating operation of the controller (100). The operation sound detecting means (36, S5) detects an operation sound generated in response to the beating operation of the controller (100). That is, the operation sound generated when the player performs the beating operation on the controller (100) is detected. The volume value detecting means (36, S11) detects a volume value of the operation sound detected by the operation sound detecting means (36, S5). The game processing means (36) changes game processes based on the operation data depending on the volume value detected by the volume value detecting means (36, S11) when both of the operation data and the operation sound are detected within a predetermined time period ("YES" in S9).

According to an illustrative example implementation, the operation sounds generated when the beating operation is performed on the controller, is detected, and the game process is changed depending on the volume value of the operation sound. That is, it is possible to determine the differences in operation to reflect it on the game. Furthermore, the differences in operation are determined by the operation sound, and therefore, there is no need to provide a detecting means for detecting the differences in operation for each button.

In another non-limiting illustrative example implementation, the game processing means performs a first game process on the basis of the operation data when the volume value detected by the volume value detecting means is equal to or more than a predetermined value, and performs a second game process on the basis of the operation data when the volume value detected by the volume value detecting means is less than the predetermined value. More specifically, the game processing means (36) performs the first game process (S15) on the basis of the operation data when the volume value detected by the volume value detecting means (36, S11) is equal to or more than the predetermined value ("YES" in S13), and performs the second game process on the basis of the operation data when the volume value detected by the volume value detecting means (36, S11) is less than the predetermined value ("NO" in S13). Accordingly, it is possible to execute different game processes depending on whether the loudness of the operation sound is equal to or more than the predetermined value.

In another illustrative non-limiting example implementation, the game processing means performs the second game process based on the operation data when only the operation data is detected. More specifically, the game processing means (36) performs the second game process (S19) on the basis of the operation data when only the operation data is detected ("YES" in S17). That is, it is possible to execute the different game processes depending on presence or absence of the operation sound as well as the loudness of the operation sound.

In a further illustrative example implementation, the game processing means performs the first game process caused by modifying the second game process when the operation data and the operation sound are detected within the predetermined time period, and the volume value of the operation sound is equal to or more than the predetermined value. More specifically, the game processing means (36) performs the first game process (S15) caused by modifying the second game process (S19) when the operation data and the operation sound are detected within the predetermined time period, and the volume value of the operation sound is equal to or more than the predetermined value. That is, it is possible to execute the different game processes on the basis of the volume value of the operation sound.

In yet a further illustrative example implementation, the game processing means changes an ability value of the player object on the basis of the volume value detected by the volume value detecting means. More specifically, the game processing means (36) changes the ability value of the player object on the basis of the volume value detected by the volume value detecting means (36, S11). Thus, it is possible to execute different game processes by changing the ability value of the player object.

In another illustrative example implementation, the first game process is a game process based on a first ability value of the player object, and the second game process is a game process based on a second ability value of the player object. More specifically, the first game process (S15) is a game process based on the first ability value of the player object. The second game process (S19) is a game process based on the second ability value of the player object. Thus, it is possible to execute the different game processes depending on the ability value of the player object.

Another game system according to an illustrative example implementation displays a game image including a player object operable by a player on a display apparatus. The game system in the above-described illustrative implementation comprises a controller, an operation data detecting means, an operation sound detecting means, and a game processing means. The controller has an operation surface which is subjected to elastic deformation by a beating operation with a hand of the player. The operation data detecting means detects operation data input in response to a beating operation of the controller. The operation sound detecting means detects the operation sound generated in response to the beating operation of the controller. The game processing means performs a first game process on the basis of the operation data when both of the operation data and the operation sound are detected within a predetermined time period, and performs a second game process on the basis of the operation data when only the operation data is detected.

In this exemplary game system implementation, similar to the above-described exemplary game system, it is possible to determine the differences in operation with a sound to reflect it on the game. That is, it is possible to execute different game processes depending on the differences in operation.

A storage medium storing a game program according to an example implementation disclosed herein is provided with a controller having an operation surface which is subjected to elastic deformation by a beating operation with a hand of the player, and displays a game image including a player object operable by a player on a display apparatus. The game program causes a computer of the game system to execute an operation data detecting step, an operation sound detecting step, a volume value detecting step, and a game processing step. The operation data detecting step detects operation data input in response to a beating operation of the controller. The operation sound detecting step detects an operation sound generated in response to the beating operation of the controller. The volume value detecting step detects detecting a volume value of the operation sound detected by the operation sound detecting step. The game processing step changes a game process based on the operation data depending on the volume value detected by the volume value detecting step when both of the operation data and the operation sound are detected within a predetermined time period.

In this exemplary game program also, similar to the above-described exemplary game system implementation, it is possible to determine the differences in operation with a sound to reflect it on the game.

Another storage medium storing a game program according to an illustrative exemplary implementation disclosed herein stores a game program of a game system that is provided with a controller having an operation surface which is subjected to elastic deformation by a beating operation with a hand of the player, and displays a game image including a player object operable by a player on a display apparatus. The game program causes a computer of the game system to execute an operation data detecting step, an operation sound detecting step, and a game processing step. The operation data detecting step detects operation data input in response to a beating operation of the controller. The operation sound detecting step detects an operation sound generated in response to a beating operation of the controller. The game processing step performs a first game process on the basis of the operation data when both of the operation data and the operation sound are detected within a predetermined time period, and performs a second game process on the basis of the operation data when only the operation data is detected.

In this exemplary game program also, similar to the above-described exemplary game system implementation, it is possible to determine the differences in operation with a sound to reflect it on the game.

A game controlling method according to an illustrative non-limiting example implementation is a game controlling method of a game system provided with a controller having an operation surface which is subjected to elastic deformation by a beating operation with a hand of the player that displays a game image including a player object operable by a player on a display apparatus. The game controlling method includes following steps of (a) detecting operation data input in response to a beating operation of the controller, (b) detecting an operation sound generated in response to the beating operation of the controller, (c) detecting a volume value of the operation sound detected by the step (b), and (d) changing a game process based on the operation data depending on the volume value detected by the step (c) when both of the operation data and the operation sound are detected within a predetermined time period.

In this exemplary game controlling method, similar to the above-described exemplary game system, it is possible to execute the different game processes depending on differences in operation.

Another game controlling method according to an illustrative non-limiting example implementation is a game controlling method of a game system that is provided with a controller having an operation surface which is subjected to elastic deformation by a beating operation with a hand of the player, and displays a game image including a player object operable by a player on a display apparatus. The game controlling method includes following steps of (a) detecting operation data input in response to a beating operation of the controller, (b) detecting an operation sound generated in response to the beating operation of the controller, and (c) performing a first game process on the basis of the operation data when both of the operation data and the operation sound are detected within a predetermined time period, and performing a second game process on the basis of the operation data when only the operation data is detected.

In an exemplary game controlling method also, similar to the above-described exemplary game system, it is possible to execute the different game processes depending on differences in operation.

The above described aspects of the example illustrative implementations will become more apparent from the following detailed description of the example illustrative implementations when taken in conjunction with the accompanying drawings.

BRIEF DESCRIPTION OF THE DRAWINGS

FIG. 7 is an illustrative view showing a format of an operation signal input from the percussion type controller to a game apparatus;

FIG. 9 is an illustrative view showing game process setting information to be executed in a video game apparatus in FIG. 1 illustrative implementation;

DETAILED DESCRIPTION OF THE PREFERRED EMBODIMENTS

Figure 1:
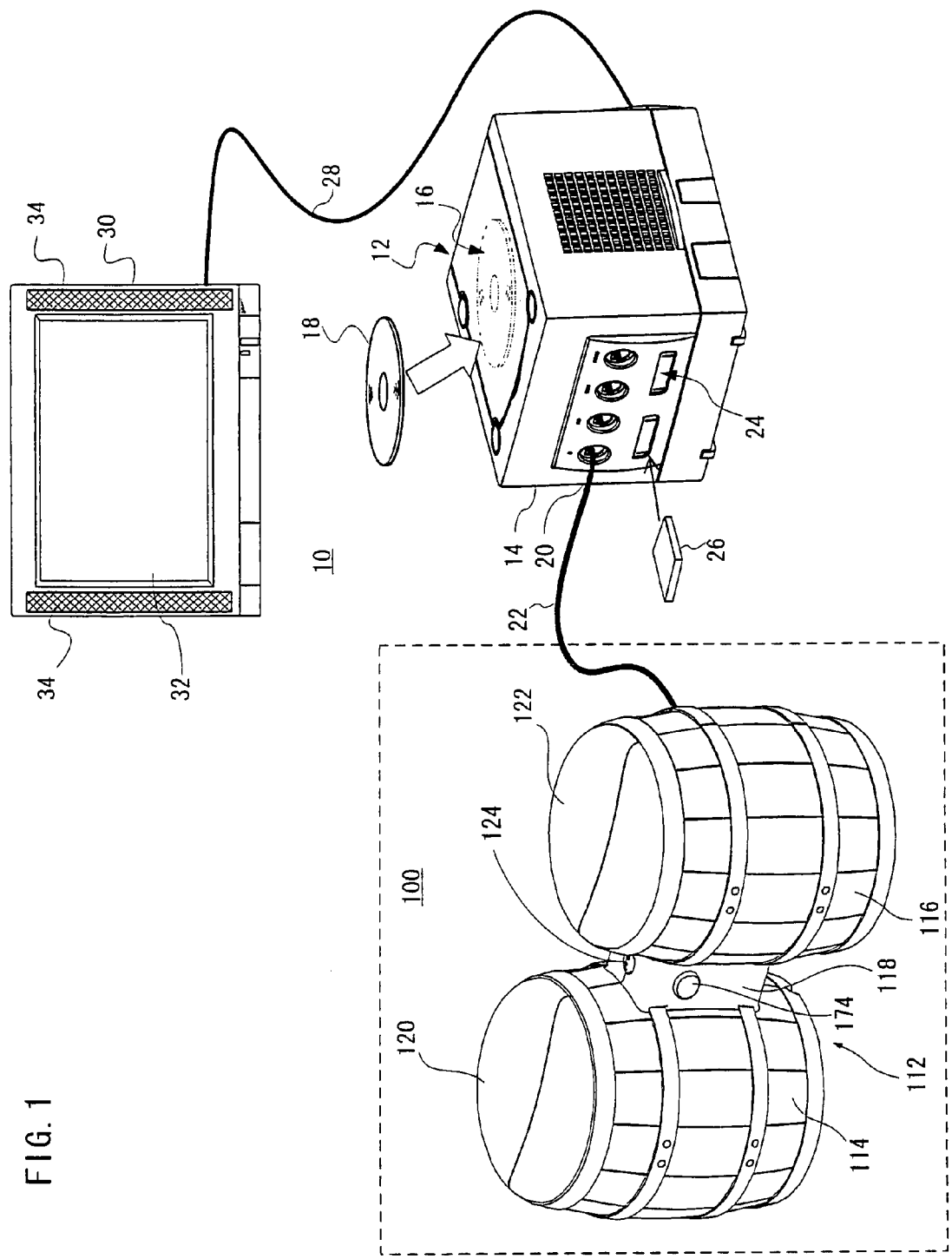
FIG. 1 is an illustrative view showing a game system of one illustrative implementation.

Referring to FIG. 1, an exemplary video game system 10 includes a video game apparatus 12. The video game apparatus 12 includes an approximately cubic housing 14, and the housing 14 is provided with an optical disk drive 16 on an upper edge thereof. An optical disk 18 which is one example of an information storage medium such as CD-ROM, DVD-ROM for storing a game program, etc. is loaded on the optical disk drive 16. The housing 14 is provided with a plurality of connectors 20 (four in this illustrative implementation) on a front surface thereof. These connectors 20 are for connecting a controller 100 to the video game apparatus 12 by a cable 22, and can connect up to the four controllers 100 to the video game apparatus 12 in this example implementation.

It is noted that the controller 100 is connected to the video game apparatus 12 by the cable 22 in this illustrative example. However, the controller 100 may be connected to the video game apparatus 12 by another method such as a wireless manner via an electromagnetic wave (e.g., radio wave or infrared ray).

At least one (two in this example) memory slot 24 is provided below the connectors 20 on the front surface of the housing 14 of the video game apparatus 12. A memory card 26 is inserted to this memory slot 24. The memory card 26 is utilized for loading the game program and etc. read from the optical disk 18 so as to temporarily store it, or storing (saving) game data (e.g., result of a game) of the game that the player plays by utilizing the game system 10.

On a rear surface of the housing 14 of the video game apparatus 12, an AV cable connector (not shown) is provided, and by utilizing the connector, a monitor 30 is connected to the video game apparatus 12 through an AV cable 28. The monitor 30 is typically a color television receiver, and the AV cable 28 inputs a video signal from the video game apparatus 12 to a video input terminal of the color television, and applies a sound signal to a sound input terminal. Accordingly, a game image of a three-dimensional (3D) video game, for example, is displayed on a screen 32 of the color television (monitor) 30. A game sound such as a game music, a sound effect and etc. is output from right and left speakers 34, or in a case of causing a surround effect with two speakers, a game sound including a surround sound is output.

In the game system 10, a user or a game player first turns on an electric power supply of the video game apparatus 12 in order to play a game (or another application), and then selects a suitable optical disk 18 storing a video game (or another application intended to play), and loads the optical disk 18 on the disk drive 16 of the video game apparatus 12. In response thereto, the game apparatus 12 starts to execute the video game or another application on the basis of software stored in the optical disk 18. The user operates the controller 100 for applying an input to the game apparatus 12. In response thereto, the game or another application is started, and a moving image object (player object) can further be moved in different directions.

Here, referring to FIG. 1-FIG. 5, the conga-type controller 100 of this example implementation is described in detail. The controller 100 includes a body 112, and the body 112 consists of a first housing 114 in the form of a barrel, a second housing 116 having approximately the same size and the same shape as the first housing 114, and a third housing 118 (connecting portion) that couples the first housing 114 and the second housing 116 and is formed in the form of quadratic prism (a rectangular parallelepiped) smaller than the first housing 114 and the second housing 116.

Furthermore, on the upper surface (top surface) of the first housing 114 and the second housing 116, covers 120 and 122 are respectively provided. The areas covered by the covers 120 and 122 are areas (operating areas) or operation surfaces to be subjected to an operation (beating operation) by a player or a user. That is, the operation apparatus or the controller 100 has two operation input surfaces on the upper surface of the first housing 114 and on the upper surface of the second housing 116. For example, the covers 120 and 122 are made of rubber, and elastically deformed in shape according to a beating operation by the player or the user, and then restored to an original shape.

It is noted that as shown in FIG. 1, on the upper surface of the third housing 3, a microphone 124 is provided. In a case of providing the hole for collecting sounds, the microphone 124 is set inside of the third housing 118, or is set such that its sound collecting portion is exposed from the hole. It is noted that although the microphone 124 is provided on the third housing 118 in this example implementation, it may be provided on the first housing 114 or the second housing 116 except for its operating area to be operated by the user (operation input portion).

Figure 2:
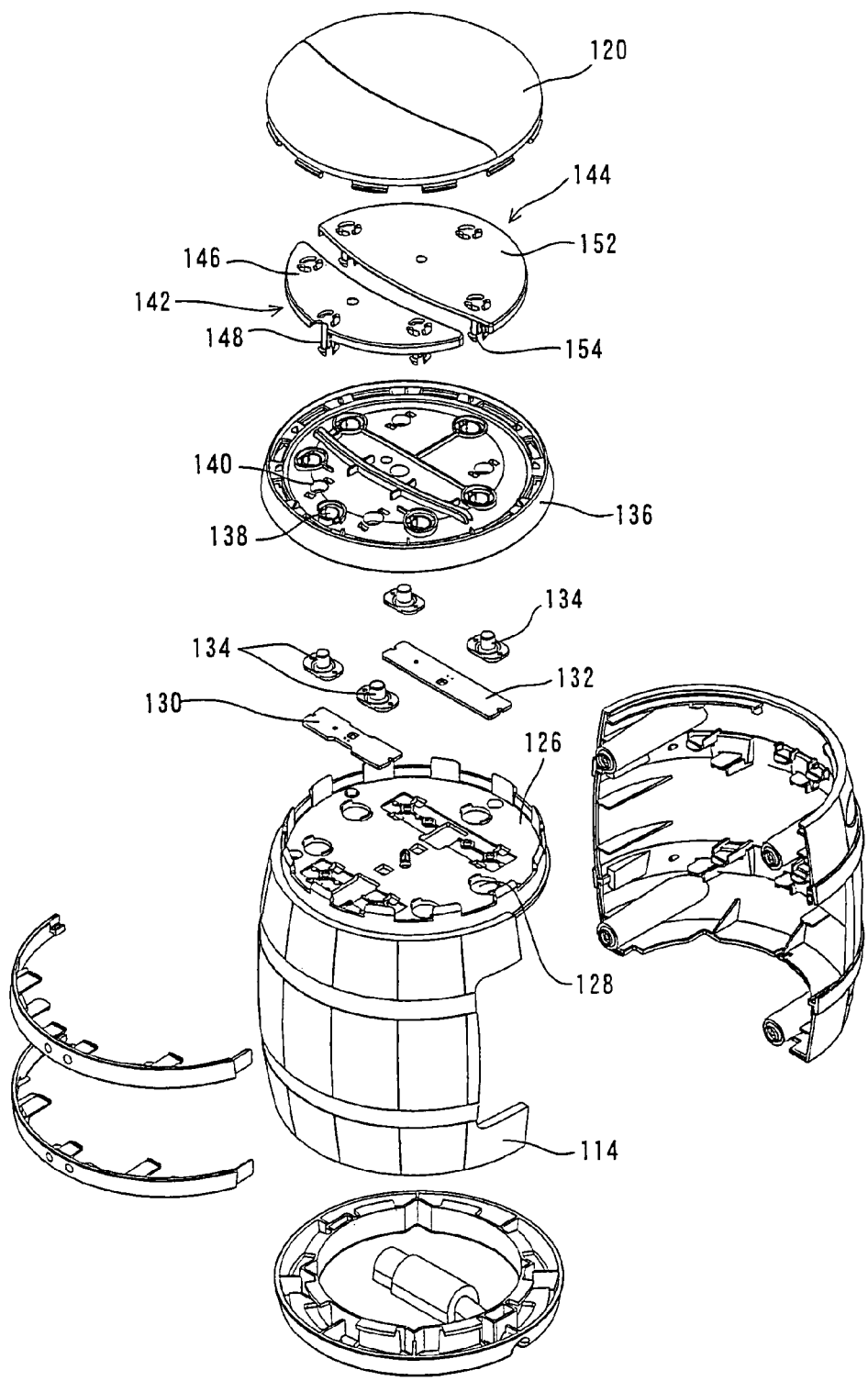
FIG. 2 is an exploded view showing a part of a percussion type controller utilized in FIG. 1 illustrative implementation.

FIG. 2 shows an exploded view of a part of the controller 100. That is, this is an exploded view as to the first housing 114, and for the sake of simplicity, this view is omitted as to the second housing 116 and the third housing 118.

Figure 4:
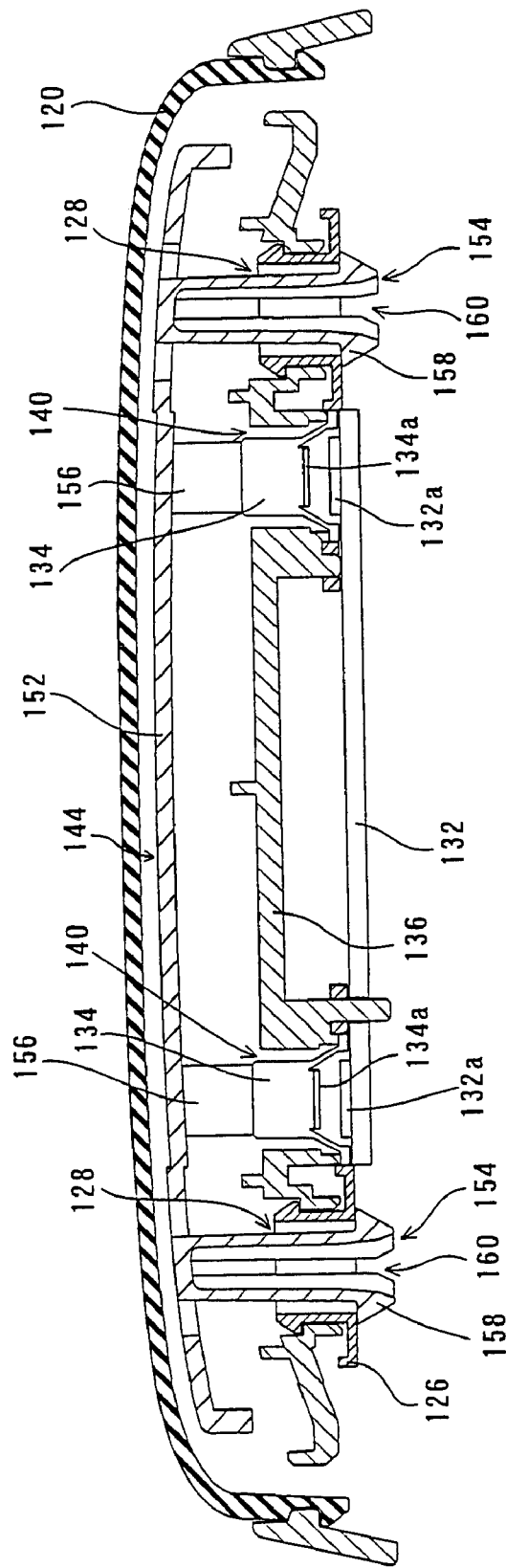
FIG. 4 is a part of a cross-sectional view of the percussion type controller at a line IV-IV in FIG. 3.
Figure 5:
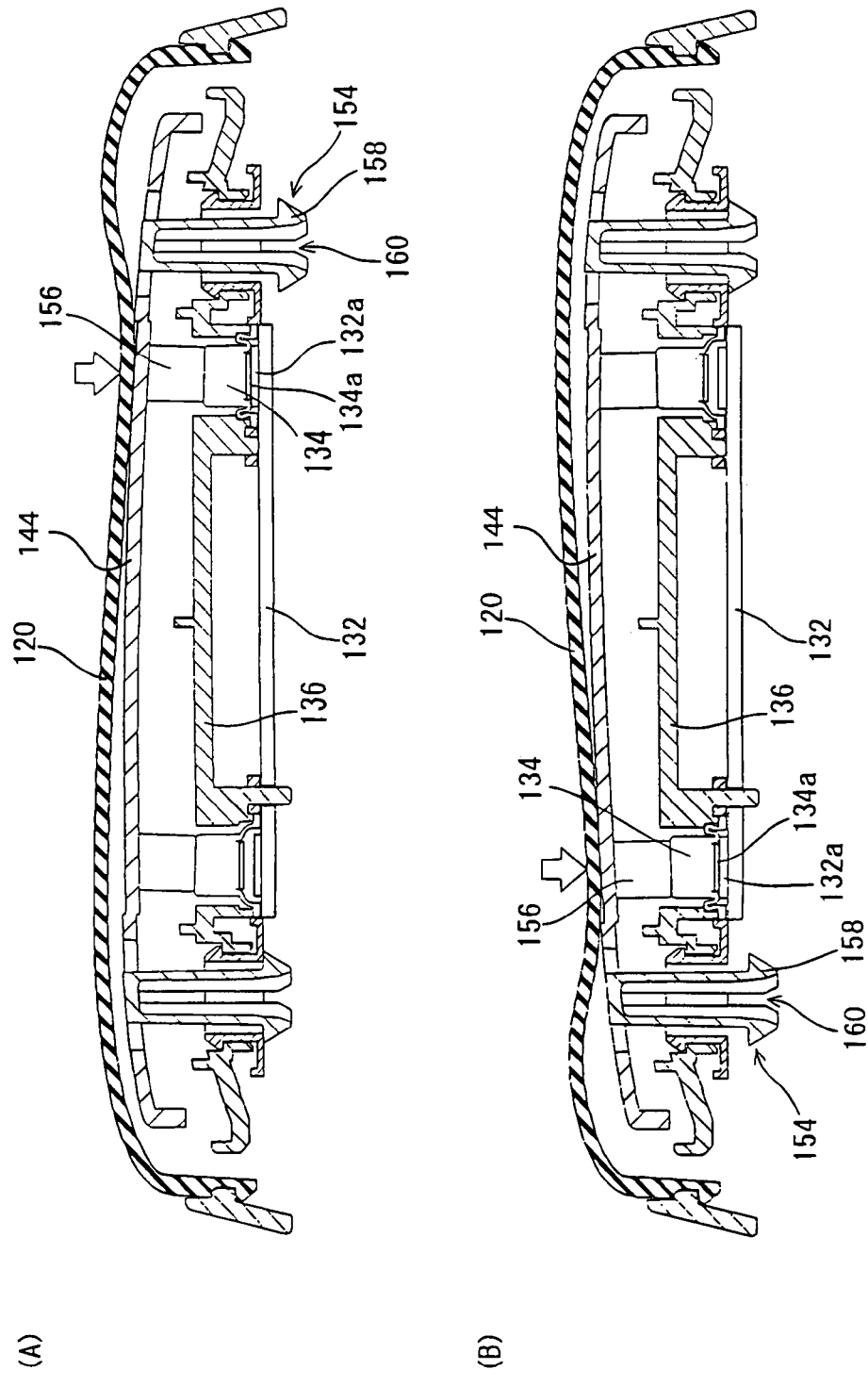
FIG. 5 is an illustrative view showing a state where a beating operation by a player is present in the cross-sectional view in FIG. 4.

Referring to FIG. 2, the first housing 114 includes an upper (ceiling) surface panel 126, and on the upper surface panel 126, switch boards 130 and 132 having a different size are provided. These switch boards 130 and 132 are fixedly arranged (housed) at predetermined positions of the upper surface panel 126. Although omitted in FIG. 2, each of the switch boards 130 and 132 has two contacts (only the contacts 132a, 132a of the switch board 132 are illustrated in FIG. 4 and FIG. 5).

On each of the switch boards 130 and 132, two rubber switches 134 are arranged, and the respective rubber switches 134 are joined to edges of depressing protrusions 150 and 156 described later. Although omitted in FIG. 2, on a rear surface of the rubber switch 134, a contact 134a is provided, and each rubber switch 134 is provided at a position opposed to each of the contacts of the switch boards 130 and 132 (see FIG. 4).

On the respective rubber switches 134, a lid 136 of the first housing 114 is provided, and this is attached on the first housing 114 so as to cover the upper surface panel 126, the switch boards 130, 132, and the rubber switches 134. The lid 136 is provided with six holes 138 that engaging protrusions 148 and 154 described later penetrate, and four holes 140 that the rubber switches 134 arranged at the positions opposed to the depressing protrusions 150 and 156 penetrate.

Figure 3:
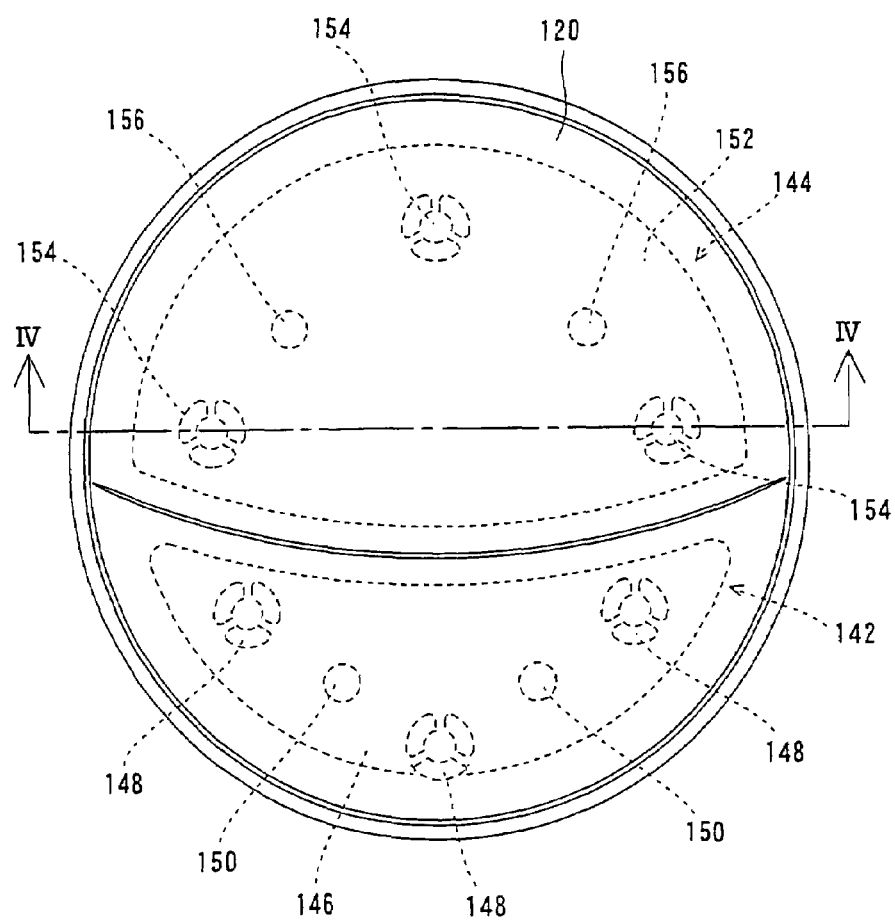
FIG. 3 is a view when viewing from above a part of the percussion type controller.

On the lid 136, depressing members 142 and 144 having a different size (shape) are provided, and over this, the cover 120 to be attached to the lid 136 is further provided. As shown in FIG. 3 and FIG. 4 being a part of a cross-sectional view IV-IV of FIG. 3, the depressing portion 144 has its main body 152 in the form of a crescent, and is provided with three engaging protrusions 154 and two depressing protrusions 156 that are downwardly protruded from the main body 152. Furthermore, the depressing member 142 has its main body 146 in the form of a dichotomy, and is provided with three engaging protrusions 148 and two depressing protrusions 150 that are downwardly protruded from the main body 146.

FIG. 3 is a view when viewing the first housing 114 and the cover 120 from directly above. The engaging protrusions 148, the depressing protrusions 150, the engaging protrusions 154 and the depressing protrusions 156 are arranged at positions shown in FIG. 3. As understood from FIG. 3, the three engaging protrusions 148 are provided at the edges (both right and left edges and lower edge) of the main body 146 of the depressing member 142, and the two depressing protrusions 150 are provided between the three engaging protrusions 148. Furthermore, the three engaging protrusions 154 are provided at the edges (both right and left edges and upper edge) of the main body 152 of the depressing member 144, and the two depressing protrusions 156 are provided between the three engaging protrusions 154. In addition, as shown in FIG. 4, the engaging protrusion 154 (this is true for the engaging protrusion 148) penetrates the hole 138 on the lid 136 and the hole 128 on the upper surface panel 126 such that its engaging portion 158 provided at the tip end penetrates the upper surface panel 126 (the inside of the first housing 114). It is noted that the lid 136 is attached to the upper surface panel 126, and whereby, the holes 128 of the upper surface panel 126 are formed inside the holes 138. Furthermore, the depressing protrusions 150 and the depressing protrusions 156 are provided so as to depress the rubber switches 134 arranged within the holes 140 of the lid 136. That is, each of the rubber switches 134 is housed within the first housing 114 such that its surface (surface to be connected with the depressing protrusion 150 and the depressing protrusion 156) is exposed from the hole 140 of the first housing 114.

It is noted that the tip ends of the depressing protrusions 150 and 156 are arranged in such a manner as to be brought into contact with the rubber switches 134 as shown in FIG. 4. Or, these may be joined by a fitting structure or an adhesive or the both thereof. Accordingly, the depressing members 142 and 144 are supported by the rubber switches 134.

In addition, as shown in FIG. 3 and FIG. 4, the engaging protrusion 154 (it is true for the engaging protrusion 148) is provided with a notch (slit) 160, and thus, each of the engaging protrusions 148 and 154 is reduced in diameter when penetrating the hole 128 of the upper surface panel 126, and then restored when having penetrated the hole 128. Then, the engaging portion 158 is engaged with the rear surface (inner wall of the first housing 114) of the upper surface panel 126. This makes it possible to prevent the depressing members 142 and 144 from being disengaged.

For example, as shown in FIG. 5 (A), when the player beats the right side of the controller 100 (cover 120), the cover 120 is elastically changed, and then the right side of the depressing member 144 (this is also true for the depressing member 142) is apt to be depressed. At this time, the engaging portion 158 of the engaging protrusion 154 provided at the left side of the depressing member 144 is engaged with the rear surface of the upper surface panel 126. This makes it possible to prevent the depressing member 144 from being upwardly actuated. Accordingly, the depressing member 144 at the right side is downwardly actuated, and the rubber switch 134 at the right side is depressed by the depressing member 156 so as to be brought into contact with the switch board 132. That is, the contact 132a and the contact 134a are brought into contact with each other.

Furthermore, as shown in FIG. 5 (B), when the player beats the left side of the controller 100 (cover 120), the cover 120 is elastically changed, and the left side of the depressing member 144 (this is also true for the depressing member 142) is apt to be depressed. At this time, the engaging portion 158 of the engaging protrusion 152 provided at the right side of the depressing member 144 is engaged with the rear surface of the upper surface panel 126. This makes it possible to prevent the depressing member 144 from being upwardly actuated. Accordingly, when the depressing member 144 at the left side is downwardly actuated, the rubber switch 134 at the left side is depressed by the depressing member 156 so as to bring the contact 134a of the rubber switch 134 into contact with the contact 132a of the switch board 132.

That is, even if the depressing member 144 (this is also true for the depressing member 142) is beaten at any position (area), at least one engaging portion 158 of the engaging protrusion 154 (148) except for the engaging protrusion 154 (148) provided at the beaten area or in proximity thereto is engaged with the rear surface of the upper surface panel 126. Due to this, when a beating operation by the player is present, the depressing member 144 (142) is depressed, a contact 134a of any rubber switch 134 is sure to be brought into contact with the contact 132a of the switch board 132 (contact of the switch board 130).

More specifically, when the left half area of the controller 100 (cover 120) shown in FIG. 5 is beaten at any position, the engaging portion 158 of the engaging protrusion 154 at the right side of the depressing member 144 is engaged with the rear surface of the upper surface panel 126, the left side of the depressing member 144 is downwardly actuated, the rubber switch 134 at the left side is depressed by the depressing member 156, and the contact 134a of the rubber switch 134 is brought into contact with the contact 132a of the switch board 132 at the left side. On the contrary thereto, when the right half area of the controller 100 (cover 120) is beaten at any position, the engaging portion 158 of the engaging protrusion 154 at the left side of the depressing member 144 is engaged with the rear surface of the upper surface panel 126, the right side of the depressing member 144 is downwardly actuated, the rubber switch 134 at the right side is depressed by the depressing member 156, and the contact 134a of the rubber switch 134 is brought into contact with the contact 132a of the switch board 132 at the right side. Furthermore, when the center area of the controller 100 (cover 120) is beaten at any position, the depressing member 144 is approximately uniformly depressed at both the right and left sides, the rubber switches 134 at the right and the left sides are depressed by the depressing members 156, and thus, both of the contacts 134a of the rubber switches 134 are brought into contact with the contacts 132a of the switch boards 132.

Thus, even if the controller 100 (cover 120) is beaten at any place (area), any one of the rubber switches is sure to be depressed to output the same operation signal.

Figure 6:
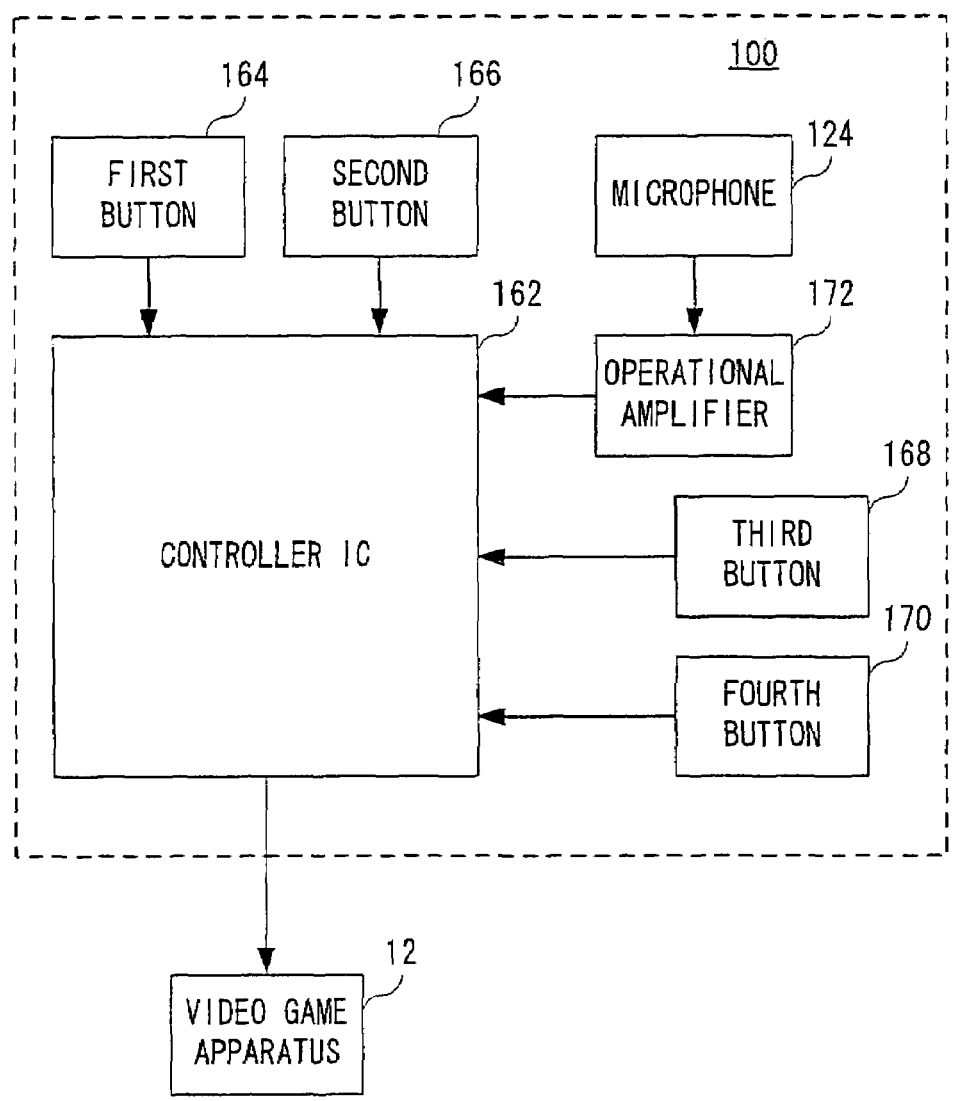
FIG. 6 is a block diagram showing an electric configuration of the percussion type controller.

FIG. 6 shows an electric configuration of the controller 100. Referring to FIG. 6, the controller 100 includes a controller IC 162, and the controller IC 162 is connected with a first button 164, a second button 166, a third button 168, and a fourth button 170. As shown in FIG. 1, the cable 22 is inserted into the connector 20 of the game apparatus 12, and whereby, the controller IC 162 is electrically connected to the game apparatus 12 as shown in FIG. 6. Furthermore, the controller IC 162 is connected with the microphone 124 via an operational amplifier 172.

The first button 164 and the second button 166 are provided within the first housing 114. In this example implementation, the first button 164 consists of the switch board 130 and the two rubber switches 134 provided on the switch board 130 (being opposed thereto). The second button 166 consists of the switch board 132 and the two rubber switches 134 provided to be opposed to the switch board 132.

The third button 168 and the fourth button 170 are provided within the second housing 116. In this example implementation, the third button 168 is constructed similarly to the first button 164, and the fourth button 170 is constructed similarly to the second button 166.

Thus, in this controller 100, the player can perform various operations by use of any one of the first button 164-the fourth button 170 or a combination of two or more thereof. The beating operation by the player is input to the controller IC 162 as a state signal indicative of an on/off state of the first button 164-the fourth button 170. Then, an operation signal corresponding to the beating operation is output to the game apparatus 12 from the controller IC 162.

In the controller 100, a sound (operation sound) generated by the player through a beating operation on the cover 120 and/or cover 122, that is, the beating operation surface is input to the microphone 124, amplified in the operational amplifier 172, and then, input to the controller IC 162. Thus, the operation signal according to the generation of the operation sound is output from the controller IC 162 to the game apparatus 12. It is noted that in order to discriminate an operation sound from a noise, when the volume of the operation sound is equal to or more than the predetermined threshold value, it is detected that the sound input is present.

In this example implementation, although an operation signal generated through a beating operation of the beating surface is detected by the microphone 124, it may be possible that depending on the kind of the game, a sound, a clapping generated by the player is detected.

FIG. 7 shows one example of a format of the operation signal (operation data) output from the controller IC 162 to the game apparatus 12. It is noted that the operation signal has a format corresponding to a standard controller of the game apparatus 12 ("GAME CUBE (trade name)" that is manufactured/marketed by the assignee of this application). Although not illustrated, the controller is provided with two analog joysticks (control stick and C stick), a cross key, an A button, a B button, an X button, a Y button, a Z button, an L trigger button, an R trigger button, and a START/PAUSE button, and so on.

As understood from FIG. 7, the operation signal or operation data consists of 8 bytes. As to the first byte (1st byte), data of "0", "0", "ORG_CH", "START", "Y", "X", "B", and "A" are written to bit 7 (b7) to bit 0 (b0), respectively. The bit 7 and the bit 6 are fixed values of "0", and to the bit 5, the data indicative of an on/off state of the setting mode "ORG_CH" is written. In this example implementation, if the setting mode "ORG_CH" is turned on, "1" is written, and if the setting mode "ORG_CH" is turned off, "0" is written. Here, the "ORG_CH" is a variable for setting a mode (setting mode) determining whether or not a standard position (original point (neutral position) of the joystick) is reset. Into the bit 4-the bit 0, data indicative of an on/off state of the START button, the Y button, the X button, the B button, and the A button are respectively written. In this example implementation, if the button is turned on, "1" is written to the relevant bit, and if the button is turned off, "0" is written to the relevant bit.

As to the second byte (2nd byte), data of "FIN", "L", "R", "Z", "UP", "DOWN", "RIGHT", and "LEFT" are written to bit 7 (b7)-bit 0 (b0), respectively. Into the bit 7, data indicative of an on/off state of a mode "FIN" for identifying a controller is written. In this example implementation, in a case of a standard controller, "1" is written, and in a case of the controller 100 (percussion type controller), "0" is written. Into the bit 6-the bit 0, data indicative of an on/off state of the L trigger button, the R trigger button, the Z button, the UP button, the DOWN button, the RIGHT button, and the LEFT button are respectively written. The data values to be written to the respective bits are the same as in the above-described Y button, and so on.

It is noted that the UP button, the DOWN button, the RIGHT button, and the LEFT button correspond to the respective buttons of the cross key.

To the third byte (3rd byte), data indicative of an amount of inclination of the control stick toward an X direction is written by binary data utilizing 8 bits in all. Accordingly, the inclination toward the X direction is represented by numerals in the "00000000" ("0" in a decimal numeral)-"11111111" ("255") range. For example, if the control stick is inclined to the left, it is close to "0", and if the control stick is inclined to the right, it is close to "255".

It is noted that in a default setting, the neutral position is represented by "128 (01000000)", and if the value is smaller than this, it is shown that the control stick is inclined toward the left direction, and if the value is greater than this, it is shown that the control stick is inclined toward the right direction. The amount of the inclination can be detected by a difference between the obtained data value and the data value at the neutral position.

To the fourth byte (4th byte), data indicative of an amount of inclination of the control stick toward the Y direction is written by binary data utilizing 8 bits in all. Accordingly, the inclination toward the Y direction is also represented by the numerals in the "00000000" ("0" in a decimal numeral) to "11111111" ("255") range. For example, if the control stick is downwardly inclined, the value is close to "0", and if the control stick is upwardly inclined, the value is close to "255".

It is noted that in a default setting, the neutral position is represented by "128 (01000000)", and if the value is smaller than this, it is shown that the control stick is downwardly inclined, and if the value is greater than this, it is shown that the control stick is upwardly inclined. The amount of the inclination can be detected by a difference between the obtained data value and the data value at the neutral position.

To the fifth byte (5th byte), data indicative of an amount of inclination of the C stick toward the X direction is written by binary data utilizing 8 bits in all. Furthermore, to the sixth byte (6th byte), data indicative of an amount of inclination of the C stick toward the Y direction is written by binary data utilizing 8 bits in all. These data value is decided similarly to the above-described control stick.

To the seventh byte (7th byte), data indicative of an amount of the depression of the L trigger button is written by binary data utilizing 8 bits in all. The data value when the L trigger button is not depressed is "00000000", and the data value is rendered greater in accordance with the amount of the depression. That is, the data value when depressed at the maximum is "11111111".

To the eighth byte (8th byte), data indicative of an amount of the depression of the R trigger button is written by binary data utilizing 8 bits in all. The data value is decided similarly to the above-described L trigger button.

The format of the operation signal is shown like this. The controller 100 is not provided with the joystick, the Y button, the X button, the B button, and the A button, but outputs to the game apparatus 12 an operation signal indicative of an on/off state of the first button 164-the fourth button 170, an operation signal in response to a generation of the sound to the microphone 124, volume data of an operation signal, and a controller identifying mode, and therefore, the data of the first byte to the third byte are utilized, for example. More specifically, with respect to the first byte, data indicative of an on/off state of the first button 164 is written to the bit 3, data indicative of an on/off state of the second button 166 is written to the bit 2, data indicative of an on/off state of the third button 168 is written to the bit 1, and data indicative of an on/off state of the fourth button 170 is written to the bit 0. Furthermore, data "0" for identifying the controller 100 (percussion type controller) is written to the bit 7 of the second byte. In addition, data indicative of the presence or absence (on/off) of a sound input to the microphone 124 is written to the third byte. It is noted that in a case of outputting data of a volume (loudness) (volume data) to the game apparatus, the data value ("00000000"- "11111111") corresponding to the volume is written to the third byte.

It is noted that as shown in FIG. 1, the controller 100 is provided with a START/PAUSE button 174, and therefore, data indicative of an on/off state is written to the bit 4 of the first byte.

Figure 8:
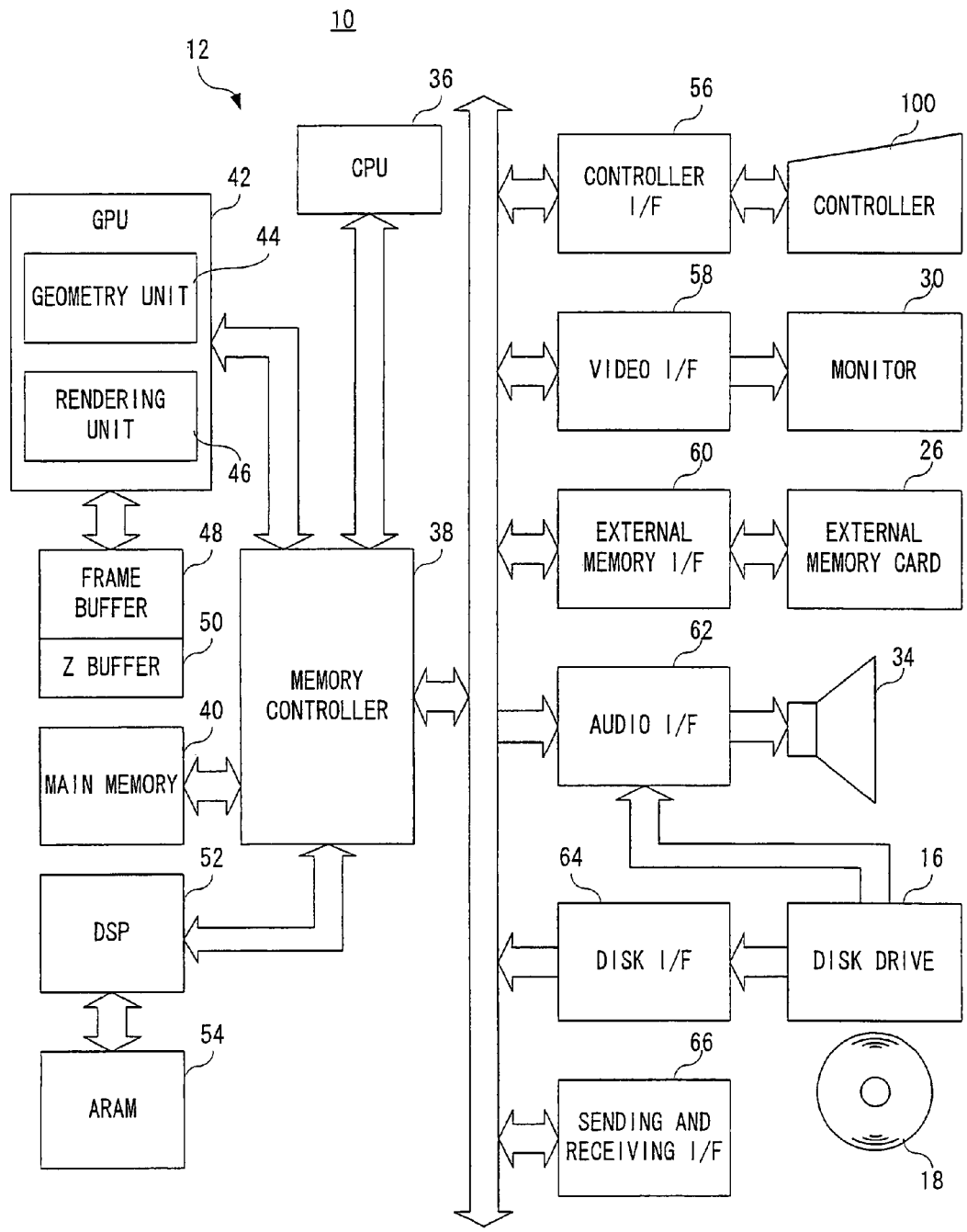
FIG. 8 is a block diagram showing an electric configuration of FIG. 1 illustrative implementation.

FIG. 8 is a block diagram showing an electrical configuration of the video game system 10 of FIG. 1 example implementation. The video game apparatus 12 is provided with a central processing unit (hereinafter, may be referred to as "CPU") 36. The CPU 36 is called a computer or a processor, and is in charge of governing overall control of the video game apparatus 12. The CPU 36 or the computer functions as a game processor, and is connected with a memory controller 38 via a bus. The memory controller 38 mainly controls writing to and reading from a main memory 40 connected via a bus under control of the CPU 36. The memory controller 38 is coupled with a GPU (Graphics Processing Unit) 42.

The GPU 42 forms a part of a rendering means, is constructed by a single chip ASIC, for example, and receives a graphics command (a construction command) from the CPU 36 via the memory controller 38 and then, in response to the command, generates the three-dimensional (3D) game image by a geometry unit 44 and a rendering unit 46. Specifically, the geometry unit 44 performs a coordinate operation process such as turn-around or rotation, movement, transformation and etc. of a variety of characters and objects (which is formed by a plurality of polygons, and the polygon is a polygonal plane defined by at least three vertex coordinates) in a three-dimensional coordinates system. The rendering unit 46 performs an image generating process such as pasting a texture (pattern image) on each of polygons of the variety of objects, and so on. Accordingly, three-dimensional image data to be displayed on the game screen is produced by the GPU 42, and the image data is rendered (stored) in the frame buffer 48.

It is noted that data (primitive, polygon, texture and etc.) required for executing the construction command by the GPU 42 is acquired from the main memory 40 via the memory controller 38.

The frame buffer 48 is a memory for rendering (storing) one frame of image data of the raster scan monitor 30, for example, and is rewritten by the GPU 42 every frame. A video I/F 58 described later reads the data stored in the frame buffer 48 via the memory controller 38, and whereby the 3D game image is displayed on the screen of the monitor 30.

Furthermore, a Z buffer 50 has a storage capacity equal to the number of pixels (storing positions or addresses) corresponding to the frame buffer 48×the number of bits of depth data per one pixel, and stores depth information or depth data (Z value) of dots corresponding to respective storing positions of the frame buffer 48.

It is noted that the frame buffer 48 and the Z buffer 50 may be constructed by utilizing a part of the main memory 40, or may be provided inside the GPU 42.

The memory controller 38 is also connected to an ARAM 54 via a DSP (Digital Signal Processor) 52. Accordingly, the memory controller 38 controls writing to and/or reading from the ARAM 54 as a sub memory in addition to the main memory 40.

The DSP 52 functions as a sound processor, and generates audio data corresponding to a sound required for the game (effective sound), a sound, or music (BGM) by use of sound wave form data (not illustrated) written to the ARAM 54.

The memory controller 38 is further connected to respective interfaces (I/F) 56, 58, 60, 62 and 64 by buses. The controller I/F 56 is an interface for the controller 100, and applies an operation signal or data from the controller IC 162 (FIG. 6) of the controller 100 to the CPU 36 through the memory controller 38. The video I/F 58 accesses the frame buffer 48 to read the image data formed by the GPU 42, and applies the image signal or the image data (digital RGB pixel values) to the monitor 30 via the AV cable 28 (FIG. 1).

The external memory I/F 60 makes the memory card 26 (FIG. 1) which is inserted into the front surface of the video game apparatus 12 communicate to the memory controller 38. This allows the CPU 36 to write and read the data to and from the memory card 26 via the memory controller 38. The audio I/F 62 receives audio data applied from the DSP 52 through the memory controller 38 or an audio stream read from the optical disk 18, and then applies an audio signal (sound signal) corresponding thereto to the speaker 34 of the monitor 30.

In addition, in a case of a stereo sound, the speaker 34 is provided at least one at left and right. Therefore, through a surround process, it is possible to hear a sound in a manner that the sound is generated from rear side of the player even if only two front left and right speakers are provided.

The disk I/F 64 connects the disk drive 16 to the memory controller 38, and whereby the CPU 36 controls the disk drive 16. The disk drive 16 writes the program data, the texture data and etc. read from the optical disk 18 to the main memory 40 under control of the CPU 36.

As described above, when the player performs a beating operation on an operation surface of the controller 100, at least any one of the first button 164, the second button 166, the third button 168 and the forth button 170 is operated, and operation data corresponding thereto (for the sake of explanation, refereed to be "first operation data") is input to the video game apparatus 12. Furthermore, an operation sound generated by the beating operation is detected by a microphone 124, and operation data corresponding thereto (for the sake of explanation, "second operation data") is input to the video game apparatus 12. It is noted that the second operation data includes volume data of the operation sound.

For example, in the video game apparatus 12, a game process (first game process) based on the first operation data and the second operation data is executed, and a game process (second game process) based on only the first operation data is executed. More specifically, in the video game apparatus 12, when the first operation data is input, a game object (player object, for example) appearing in a virtual game executes an arbitrary action such as hitting, running, throwing, jumping, and so on according to a command indicated by the first operation data. In addition, in the video game apparatus 12, an ability value of the player object as to the action to be executed according to the command indicated by the first operation data is changed on the basis of the second operation data.

In this example implementation, the volume data (volume value) included in the second operation data is detected, and the ability value of the player object is changed according to the magnitude of the volume value, that is, the difference of strength in beating operation. To describe it in detail, it is determined whether or not the volume value is equal to or more than a predetermined threshold value (different from the threshold value for determining whether the operation sound is input). If the volume value is equal to or more than the predetermined threshold value, an ability value as to an action to be executed according to the command indicated by the first operation data is changed (increased), and then, the action (first game process) is executed. Conversely, in a case that the volume value is less than the predetermined threshold value, the ability value as to an action to be executed according to the command indicated by the first operation data is not changed, and then, the action (second game process) is executed.

Figure 10:
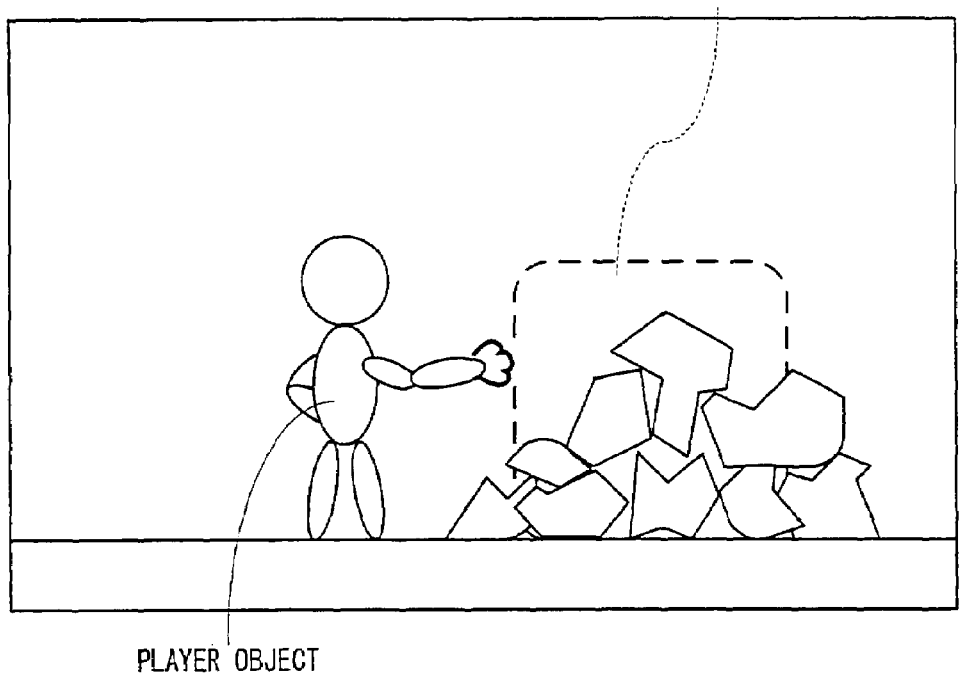
FIG. 10 is an illustrative view showing one example of a game screen to be displayed on a monitor of FIG. 1 illustrative implementation.
Figure 10:
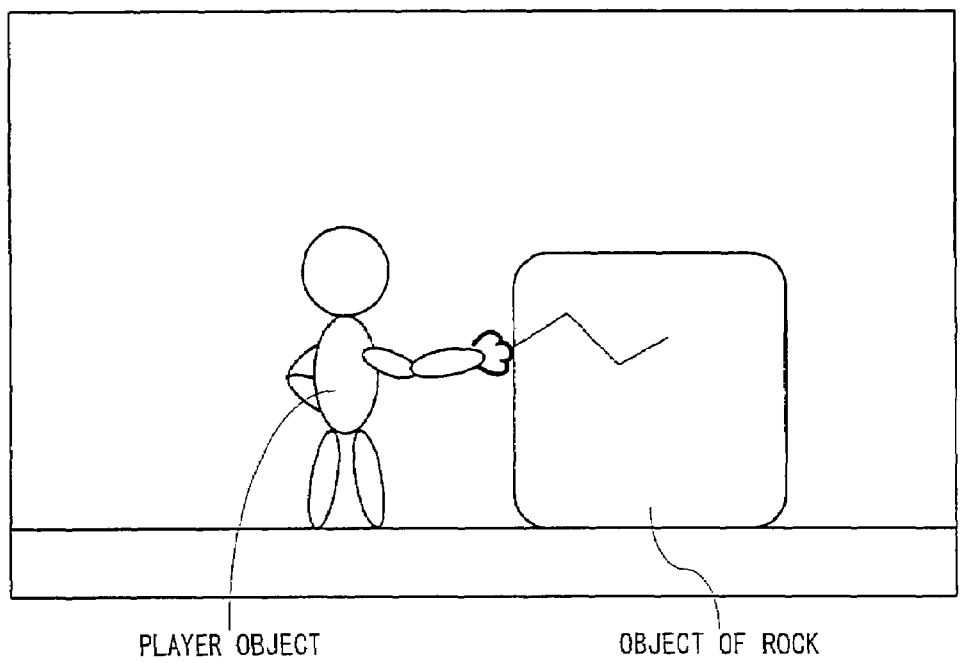

One example of the game process setting information in such a case is shown in FIG. 9. For example, if the action to be executed according to the command indicated by the first operation data is "punch", when the first game process is executed, an offensive power as the ability value is "20". The offensive power in a case of executing the second game process described later is "10", and therefore, it can be understood that the offensive power is increased on the basis of the second operation data (volume data). Accordingly, as can be understood from one example of the game screen of the first game process as shown in FIG. 10 (A), it is possible to destroy an object such as a stone (block) hindering the progress. On the other hand, when the second game process is executed on the basis of only the first operation data, the offensive power does not change (increase), and the current offensive power of the player object remains to be "10". In this case, as can be understood from one example of the game screen of the second game process shown in FIG. 10 (B), it is impossible to destroy the object such as a rock hindering the progress.

Furthermore, if the action to be executed according to the command indicated by the first operation data is "jump", when the first game process is executed, the ability value of a jumping power becomes "30". The jumping power is increased on the basis of the second operation data (volume data) similarly in a case where "punch" is an action. Accordingly, as can be understood from another example of the game screen of the first game process shown in FIG. 11 (A), when the first game process is executed, the player object can move (jump) to a relatively higher place. On the other hand, when the second game process is executed on only the first operation data, the jumping power does not change (increase), and the current jumping power of the player object remains to be "15". In this case, as can be understood from another example of the game screen of the second game process shown in FIG. 11 (B), it is impossible to move to a relatively higher place.

Figure 11:
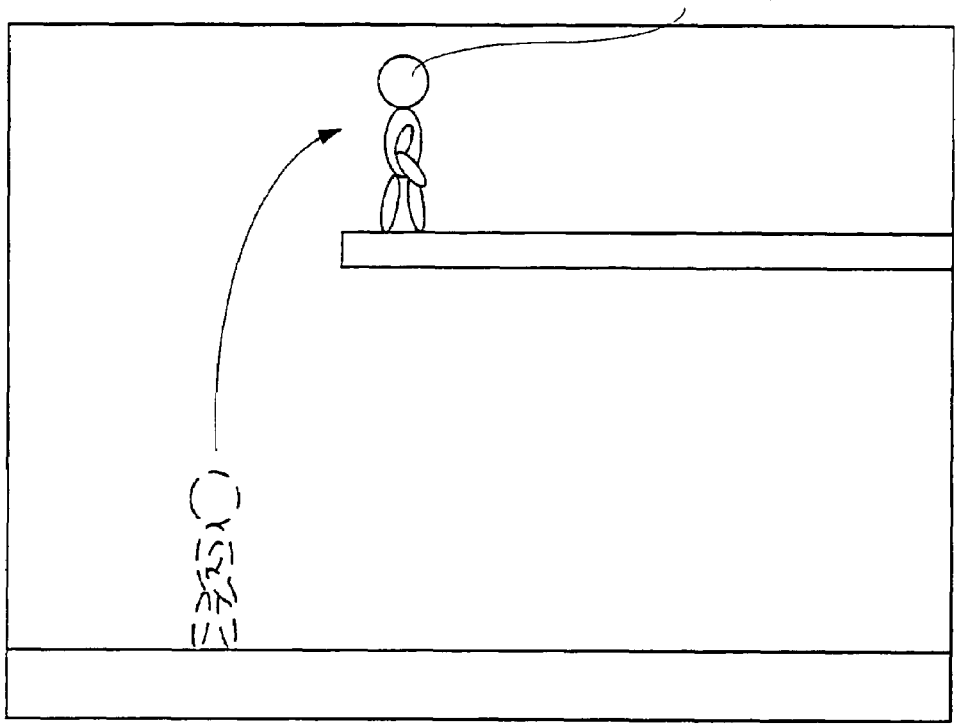
FIG. 11 is an illustrative view showing another example of a game screen to be displayed on the monitor of FIG. 1 illustrative implementation.
Figure 11:
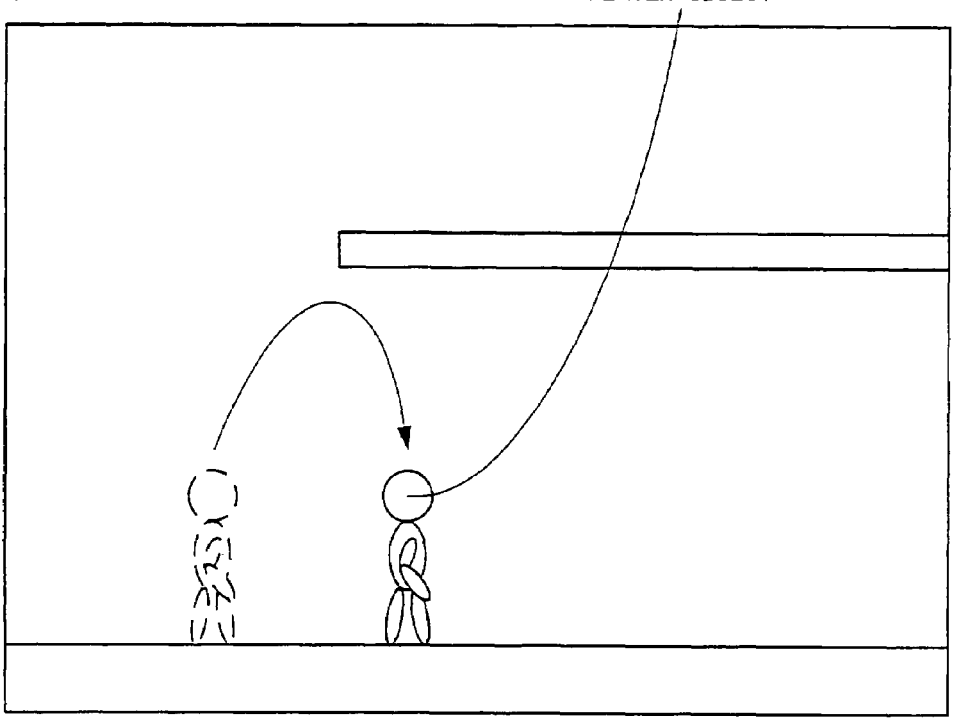

It is noted that the game process and the game screen shown in FIG. 9-FIG. 11 are simple illustration, and it is worthy of notice that the ability value of the player object is changed on the basis of the second operation data (volume data).

Figure 12:
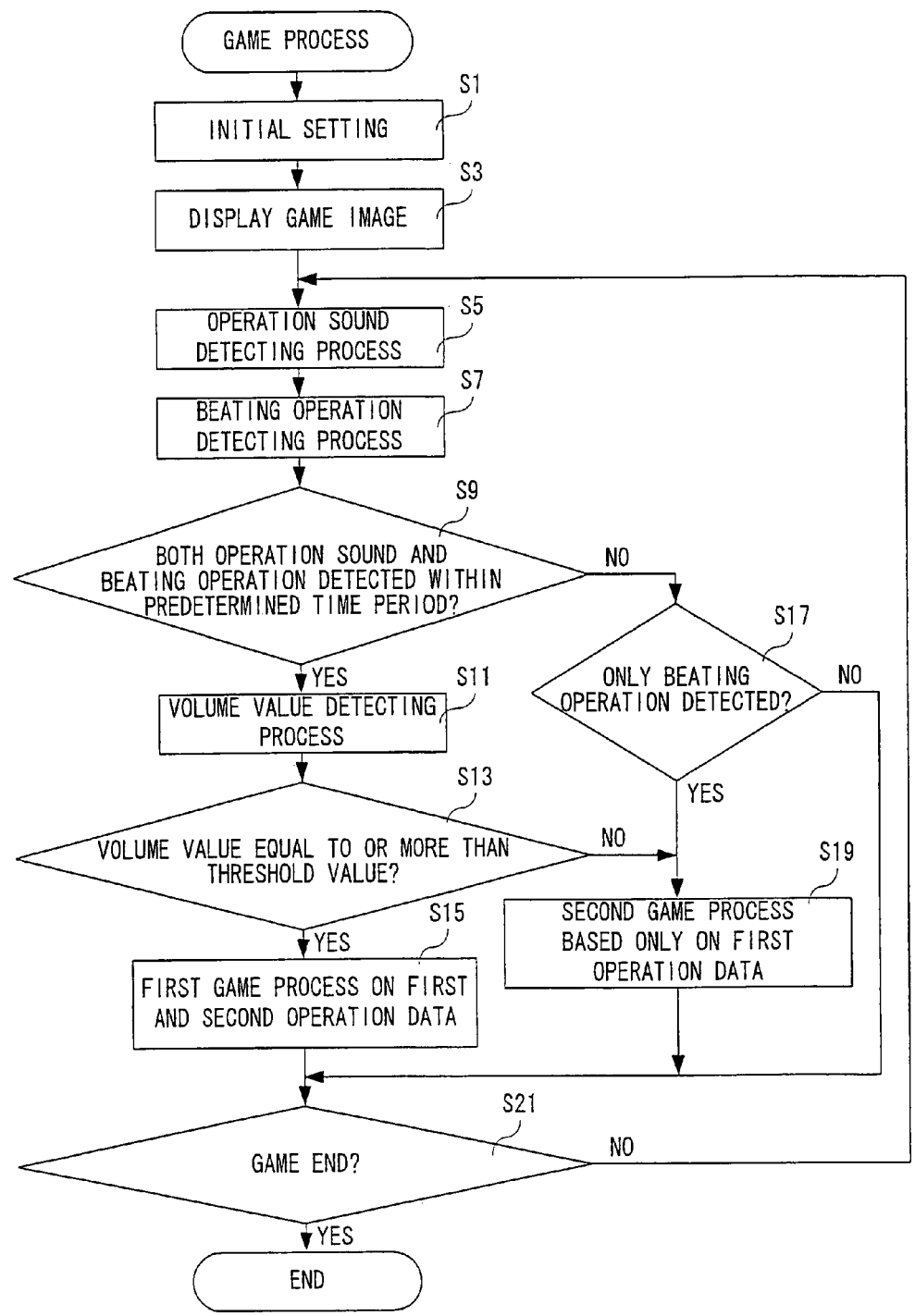
FIG. 12 is a flowchart showing a game process of a CPU in FIG. 1 illustrative implementation.

More specifically, the CPU 36 shown in FIG. 8 executes a game process according to a flowchart shown in FIG. 12. For example, when the player instructs a game start by operating the controller 100, the CPU 36 starts a game process, and executes an initial setting in a step S1. Here, a work area and a buffer area of the main memory 40 are cleared. In a succeeding step S3, a game screen is displayed. For example, a game screen of a three-dimensional image including a player object, an enemy object, and another object is displayed.

In a step S5, an operation sound detecting process is executed. Here, it is detected whether or not the second operation data (including the volume data of the operation sound) according to the format shown in FIG. 7 is input from the controller 100. Next, in a step S7, a beating operation detecting process is executed. Here, it is detected whether or not the first operation data according to the format shown in FIG. 7 is input from the controller 100. It is noted that the processes in the steps S5 and S7 can be executed in a reversed order. That is, it is appropriate that the operation sound (second operation data) and the beating operation (first operation data) are detected in the process in the step S5 and the step S7.

Then, in a step S9, it is determined whether or not both of the operation sound and the beating operation are detected within a predetermined time period (30 msec, for example). That is, it is determined whether or not a time period from the detection of the operation sound in the step S5 to the detection of the beating operation in the step S7 is within a predetermined time period. The reason why such the determination is made is that only the operation sound when generated through the beating operation is reflected on the game process. It is noted that both the steps S5 and S7 are executed in the reverse order, and therefore, one of the operation sound and the beating operation is detected, and then, whether or not the other is detected within the predetermined time period is determined.

If "YES" in the step S9, that is, if the both of the operation sound and the beating operation are detected within the predetermined time period, a volume value detecting process is executed in a step S11. Here, a data value ("00000000"-"11111111") of the volume data included in the second operation data as to the operation sound is detected. Next, in a step S13, it is determined whether or not the volume value, that is, the data value of the volume data is equal to or more than a threshold value ("01000000" in this example implementation). If "NO" in the step S13, that is, if the volume value is less than the threshold value, it is determined that the second operation data is not reflected on the ability value, and then, the process proceeds to a step S19.

On the other hand, if "YES" in the step S13, that is, if the volume value is equal to or more than the threshold value, by determining that the second operation data is reflected on the ability value, the first game process is executed on the basis of the first operation data and the second operation data in a step S15, and then, the process proceeds to a step S21. That is, in the step S15, the ability value as to an action to be executed according to the command indicated by the first operation data is increased, and then, the action is executed.

Furthermore, if "NO" in the step S9, that is, if both of the operation sound and the beating operation are not detected within the predetermined time period, it is determined whether or not only the beating operation, that is, the first operation data is detected in a step S17. If "NO" in the step S17, that is, if only the beating operation is not detected, the process directly proceeds to the step S21. On the other hand, if "YES" in the step S17, that is, if only the beating operation is detected, the second game process is executed on the basis of only the detected beating operation, that is, the first operation data in the step S19, and the process proceeds to the step S21. That is, in the step S19, without increasing the ability value as to an action to be executed according to the command indicated by the first operation data, the action is executed.

In the step S21, it is determined whether the game end or not. That is, it is determined whether an instruction of the game end is applied from the player, or the game is over. If "NO" in the step S21, that is, if it is not the game end, the process returns to the step S5. On the other hand, if "YES" in the step S21, that is, if it is the game end, the game process is ended.

According to this example implementation, the operation sound generated when a beating operation is performed on the controller is detected to reflect a loudness of the detected operation sound on the content of the game, and therefore, it is possible to change the content of the game depending on the difference of strength in operation by detecting the operation sound at a time of operating the controller.

It is noted that one threshold value is prepared to execute the first game process or the second game process according to the magnitude of the volume value in this illustrative implementation. However, it may be possible that two or more threshold values are prepared to selectively execute different three or more game processes.

Furthermore, in this example implementation, in a case that the volume value is less than the threshold value, and in a case that only the beating operation is detected, the same second game process is executed. However, a different game process can be executed between a case where the volume value is less than the threshold value and a case where only the beating operation is detected.

In addition, in this example implementation, a description is made on a case that the beating operation and the operation sound are separately detected, but in some cases, one operation signal (operation data) includes the first operation data and the second operation data. In such a case, it may be said that the first operation data and the second operation data are detected within the predetermined period.

A game system 10 of another example implementation is the same as the above-described example implementation except for that the magnitude of the volume value is directly reflected on the game process, and therefore, a duplicated description will be omitted. That is, in the above-described example implementation, depending on whether or not the operation sound generated when a beating operation is performed is equal to or more than the threshold value, it is determined whether or not the game process is to be changed (S13, S15, S19 in FIG. 12). However, in the other example implementation, the ability value of the player object is changed depending on the magnitude of the volume value. That is, a change amount of the ability value is determined on the basis of the volume value.

Describing in detail, when an operation sound simultaneously generated at a time of performing a beating operation on the controller 100 is detected, the volume value of the operation sound is detected to determine the change amount of the ability value according to the volume value. Here, the data value of the volume is a value between "00000000"-"11111111", and therefore, a maximum value of the change amount of the ability value is determined, and by multiplying the maximum value of the change amount by the ratio of the data value (volume value) of the detected volume to the maximum value of the data value of the volume, the change amount of the ability value is obtained. Then, at a time of executing the first game process, the change amount is added to the ability value.

Furthermore, by representing the change amount in a negative numerical value, it is possible to decrease the ability value. For example, the data value of the volume is divided into "00000000"-"00111111" and "01000000"-"11111111". Then, in a case that the data value of the volume is equal to or less than "00111111", the change amount is determined such that the smaller the data value is, the larger the change amount being a negative numerical value is. On the other hand, in a case that the data value of the volume is equal to or more than "01000000", the change amount is determined such that the larger the data value is, the larger the change amount being the positive numerical value is. Thus, when the first game process is executed, the change amount is added to the ability value to allow the ability value to be increased or decreased.

In addition, a change amount of the ability value may be assigned to each of the data value of the volume "00000000"-"11111111", and a change amount corresponding to the detected data value (volume value) of the volume may be added to the ability value.

It is noted that these are only illustrative examples, and it is worthy of notice that data value of the volume itself may be reflected on the ability value.

Figure 13:
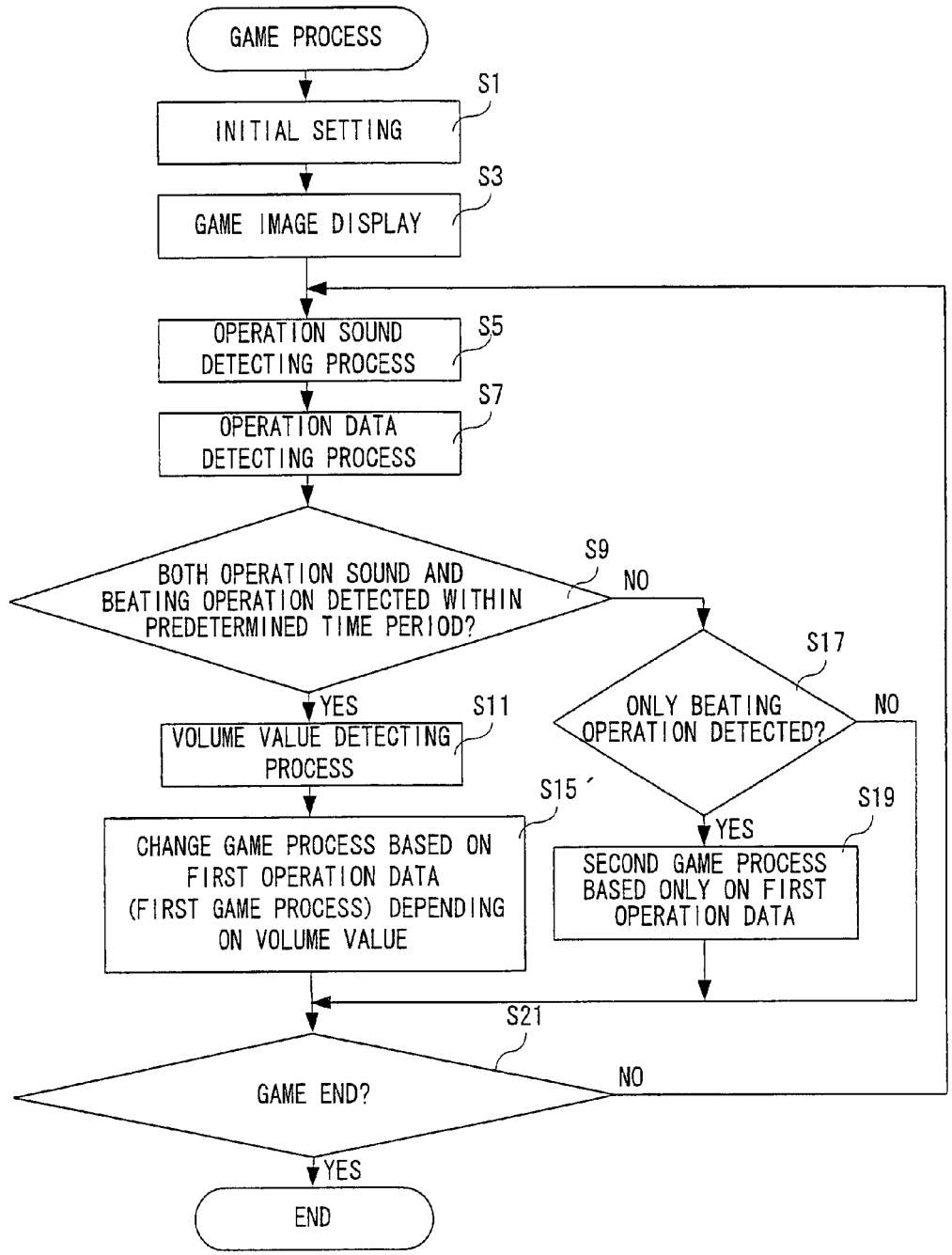
FIG. 13 is a flowchart showing a game process of the CPU in another illustrative implementation.

More specifically, the CPU 36 executes a game process according to a flowchart shown in FIG. 13. It is noted that the flowchart of the game process shown in FIG. 13 is approximately the same as the flowchart of the game process shown in FIG. 12, and therefore, the same reference numerals are applied to the same processes. Furthermore, a description as to the same process will be omitted.

Referring to FIG. 13, the flowchart of the game process is different from the flowchart of the game process in FIG. 12 in that the step S13 in FIG. 12 is deleted, and the process in the step S15 is modified to the process in a step S15', and the both flowcharts are the same except for that.

That is, when both of the operation sound and the beating operation are detected within the predetermined period ("YES" in the step S9), the volume value is detected in the step S11, and then, the process proceeds to the step S15'. In the step S15', the change amount of the ability value is determined on the basis of the detected volume value, and the game process (first game process) in which the ability value of the player object is changed with the determined change amount is executed.

In another example illustrative implementation also, it is possible to change the content of the game depending on the difference of strength in operation by detecting the operation sound at a time of operating the controller.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game system for displaying a game image including a player object operable by a player on a display apparatus, comprising:
    a controller device having an operation surface that produces an audible percussive sound when subjected to a physical impact, said controller also generating an operation data input signal in response to an elastic deformation of said surface by a physical impact;
    operation data detector programmed logic circuitry configured to detect one or more operation data input signals generated by said controller device in response to a beating of said operation surface of said controller device by said player;
    an audible sound detector that detects one or more audible percussive sounds produced by said beating upon the operation surface of the controller or by other audible percutient player actions;
    volume value determining programmed logic circuitry configured to determine a volume level value for an audible percussive sound detected by said sound detector; and
    game processing programmed logic circuitry configured to change a game process in response to an operation data input signal when both an operation data input signal and an audible percussive sound are detected as occurring together within a predetermined time period.

2. A game system according to claim 1, wherein said game processing programmed logic circuitry performs a first game process in response to said operation data input signal when the volume value determined for a detected audible percussive sound is equal to or more than a predetermined value, and performs a second game process in response to said operation data when the volume value determined for said detected audible percussive sound is less than the predetermined value.

3. A game system according to claim 2, wherein
    said game processing programmed logic circuitry performs said second game process in response to said operation data input signal when only said operation data input signal is detected.

4. A game system according to claim 2, wherein said game processing programmed logic circuitry performs said first game process modified by said second game process when said operation data input signal and said audible percussive sound are detected within said predetermined time period, and the determined volume value of said audible percussive sound is equal to or more than the predetermined value.

5. A game system according to claim 1, wherein
    said game processing programmed logic circuitry changes an ability value of said player object based on the volume value determined by said volume value determining programmed logic circuitry.

6. A game system according to claim 5, wherein
    said first game process is performed based on a first ability value of said player object, and said second game process is performed based on a second ability value of said player object.

7. A game system for displaying a game image including a player object operable by a player on a display apparatus, comprising:
    one or more controller devices having an operation surface that produce an audible percussive sound when subjected to a physical impact, said controller also generating an operation data input signal in response to an elastic deformation of said surface by a physical impact;
    operation data detector that detects one or more operation data input signals generated by a controller device in response to a beating of said operation surface of said controller device by said player;
    an audible sound detector that detects one or more audible percussive sounds produced by said beating upon the operation surface of the controller or by any other audible sound-producing percutient action by a player; and
    game processing programmed logic circuitry that performs a first game process in response to an operation data input signal when both of an operation data input signal and an audible percussive sound are detected within a predetermined time period, and performs a second game process in response to said operation data input signal when only said operation data input signal is detected within said predetermined time period.

8. A computer-readable storage medium storing a game program executable by a computer of a game system that is provided with a controller device, the controller device to generate an input signal when an operation surface of said device is subjected to an elastic deformation, said surface to produce an audible percussive sound when subjected to a percutient action by a player, and said game system having a display apparatus that displays a game image including a game object operable by a player on a display apparatus using said controller, said game program causing a computer of said game system to perform operations of:
    detecting one or more operation data input signals, said operation data input signals generated by said controller in response to a percutient action which deforms the operational surface of said controller;
    detecting an audible sound generated by said percutient action to the operation surface of the controller by a player;
    determining a volume amplitude level of a detected audible sound generated by said percutient action, and generating a corresponding volume value of the detected audible sound; and
    changing a game process in response to detecting one or more of said operation data input signals depending on whether said generated volume value is greater than a predetermined volume value when both an operation data input signal and an audible sound generated by said percutient action to the controller operation surface are detected as occurring within a predetermined time period of each other.

9. A computer-readable storage medium storing a game program executable by a computer of a game system that is provided with a controller device, the controller device to generate an input signal when an operation surface of said device is subjected to an elastic deformation, said surface to produce an audible percussive sound when subjected to a percutient action by a player, and said game system having a display apparatus that displays a game image including a game object operable by a player using said controller, said game program causing a computer of said game system to perform operations of:

- detecting an operation data input signal generated by the controller in response to a percutient action which deforms the operational sin-face of said controller;
- detecting an audible sound generated by said percutient action to the operation surface of said controller by a player; and
- performing a first game process when both of said operation data impact signal and an audible percussive sound produced by said percutient action are detected as occurring within a predetermined time of each other, and performing a second game process when only said operation data input signal is detected within said predetermined time.

10. A method of controlling progress of a game played on a computer controlled game system that is provided with a controller device, the controller device to generate a data input signal to said computer when an operation surface of said device is subjected to an elastic deformation and wherein said surface produces an audible percussive sound when subjected to a percutient action by a player, and said game system having a display apparatus that displays a game image including a player object operable by a player using said controller device, comprising:

- detecting one or more operation data input signals, said signals generated by the controller device in response to a percutient action performed by a player which causes a deformation of the operation surface of the controller,
- detecting an audible percussive sound produced by said percutient action to the operation surface of the controller;
- determining a volume value of a detected audible percussive sound, and
- changing a game process based on said operation data input signal depending on a volume value determined when both of said operation data input signal and said audible percussive sound are detected as occurring within a predetermined time period of each other.

11. A method of controlling progress of a game played on a computer controlled game system that is provided with a controller device, the controller device to generate a data input signal to said computer when an operation surface of said device is subjected to an elastic deformation and wherein said surface produces an audible percussive sound when subjected to a percutient action by a player, and said game system having a display apparatus that displays a game image including a player object operable by a player using said controller device, comprising:

- detecting an operation data input signal, said signal generated by the controller device in response to a percutient action performed by a player which causes a deformation of the operation surface of said controller;
- detecting an audible percussive sound produced by a percutient action, and
- performing a first game process in response to said operation data input signal when both of said operation data input signal and said audible percussive sound are detected as occurring within a predetermined time of one another, and performing a second game process in response to said operation data input signal when only said operation data input signal is detected.

12. The method of claim 11, wherein an ability value of said player object is changed based on the determined volume value.

13. The method of claim 12, wherein said first game process is performed based on a first ability value of said player object, and said second game process is performed on a second ability value of said player object.

* * * * *